United States Patent
Lunz

(10) Patent No.: US 8,511,904 B2
(45) Date of Patent: Aug. 20, 2013

(54) READY-TO-INSTALL NEEDLE BEARING COMPRISING AN INNER AND OUTER RING

(75) Inventor: Erich Lunz, Lonnerstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1048 days.

(21) Appl. No.: 12/282,012

(22) PCT Filed: Jan. 26, 2007

(86) PCT No.: PCT/EP2007/050802
§ 371 (c)(1),
(2), (4) Date: Sep. 8, 2008

(87) PCT Pub. No.: WO2007/101750
PCT Pub. Date: Sep. 13, 2007

(65) Prior Publication Data
US 2009/0074344 A1    Mar. 19, 2009

(30) Foreign Application Priority Data
Mar. 7, 2006 (DE) .......................... 10 2006 010 313

(51) Int. Cl.
*F16C 33/58* (2006.01)
*F16C 33/64* (2006.01)
*F16C 19/46* (2006.01)

(52) U.S. Cl.
USPC ........... 384/569; 384/564; 384/618; 384/625; 29/898

(58) Field of Classification Search
USPC ......... 384/457, 492, 523, 564–565, 569–570, 384/618, 625, 903, 912; 29/898, 898.11, 29/898.41, 898.066, 898.15
See application file for complete search history.

(56) References Cited

U.S. PATENT DOCUMENTS

| | | | | |
|---|---|---|---|---|
| 2,008,378 A | * | 7/1935 | Witte | 384/551 |
| 2,074,182 A | | 3/1937 | Heim | |
| 2,244,197 A | * | 6/1941 | Hessler | 384/569 |
| 2,259,325 A | * | 10/1941 | Robinson | 384/569 |
| 2,334,227 A | * | 11/1943 | Stallman | 384/569 |
| 2,668,743 A | * | 2/1954 | Zeuzem | 384/457 |
| 2,765,203 A | * | 10/1956 | Barr et al. | 384/564 |
| 3,328,097 A | * | 6/1967 | Wilson | 384/560 |
| 4,257,655 A | * | 3/1981 | Mirring | 384/569 |
| 4,492,415 A | * | 1/1985 | Baile et al. | 384/463 |
| 6,682,227 B2 | | 1/2004 | Grell et al. | |

FOREIGN PATENT DOCUMENTS

| | | |
|---|---|---|
| DE | 641956 | 6/1937 |
| DE | 1623501 | 5/1951 |
| DE | 928020 | 4/1955 |

(Continued)

*Primary Examiner* — Marcus Charles
(74) *Attorney, Agent, or Firm* — Volpe and Koenig, P.C.

(57) ABSTRACT

A ready-to-install needle bearing including a thin-walled outer ring (1) that is shaped without cutting and is provided with radially inwardly-facing stop rims (2) on both sides. Needle rollers (7) roll between the stop rims (2) on an associated external raceway (9). The inventive needle bearing is characterized in that an associated internal raceway (10) is formed by a thin-walled inner ring (3) which is shaped without cutting and is fitted with radially outwardly-facing stop rims (4) on both sides. The needle rollers (7) roll in a cageless manner or are disposed in a cage such that a captive ready-to-install needle bearing unit is created by using a positive gripping action, thus dispensing with the need for a part that is to be mounted having to act as a raceway.

3 Claims, 1 Drawing Sheet

(56) References Cited

FOREIGN PATENT DOCUMENTS

| DE | 1894138 | 3/1964 |
|---|---|---|
| DE | 1910796 | 2/1965 |
| DE | 6605971 | 7/1970 |
| DE | 2257155 | 3/1974 |
| DE | 2741057 | 3/1979 |
| DE | 19732478 | 12/2005 |
| GB | 2004600 | 4/1979 |
| GB | 2097488 A * | 11/1982 |
| JP | 2002180203 A * | 6/2002 |
| WO | 0181643 | 11/2001 |

* cited by examiner

READY-TO-INSTALL NEEDLE BEARING COMPRISING AN INNER AND OUTER RING

BACKGROUND

The invention relates to a ready-to-install needle bearing with a thin-walled outer ring, which is shaped without cutting and which is provided on both sides with radially inwardly-facing stop rims, with needle rollers rolling between these stop rims on an associated external raceway. The invention also relates to an associated method for the production of the needle bearing according to the invention.

The needle bearing is a cylindrical roller bearing variant with thin, long roller bodies and can be loaded only in the radial direction. Needle bearings have needle rollers with a ratio of diameter:length between 1:2.5 and 1:10. The radial and axial sliding surfaces of the cage or stop rims of the bearing rings take over the axial guidance of the needle rollers. Needle bearings have a very low overall height. Therefore, they are especially well suited for lightweight designs and constructions, in which the installation space in the radial direction is limited.

A ready-to-install needle bearing in the form of a drawn cup needle roller bearing with open ends is known from Catalog 307 "Needle bearings/cylindrical roller bearings" of INA Wälzlager Schaeffler K G, Industriestraβe 1-3, 91072 Herzogenaurach, March 1997. As the associated page 116 of the catalog shows, such a needle bearing is made from a thin-walled outer ring, which is shaped without cutting and which is provided on both sides with radially inwardly-facing stop rims. Between both stop rims there is a needle roller and cage assembly made from needle rollers and a cage, wherein the cage, on one hand, protects the needle rollers from falling inward in the radial direction and, on the other hand, guides these needle rollers in an axis-parallel manner. However, due to its lack of an inner ring, this drawn cup needle roller bearing requires that a supported shaft must be used as an internal raceway. Therefore, it is necessary that such a shaft is hardened and ground in a complicated fashion.

Another ready-to-install needle bearing is distinguished in that the needle rollers are held, in turn, in the axial and radial outward direction in a thin-walled drawn cup, which is shaped without cutting and which forms the external raceway. To also protect the needle rollers from falling in the inward direction, it is known to flange the lateral stop rims of the drawn cup around the ends of the needle rollers. Here it is disadvantageous that, in this arrangement, the ends of the needle rollers must be provided with a journal, which is gripped underneath by the flange edge of the stop rims. Needle rollers configured in this way, however, are very complicated to manufacture. Such a ready-to-install needle bearing is known, for example, from DE 1 894 138 U1. It is also disadvantageous that, in this case, as already discussed above, due to the lack of the inner ring, the shaft to be supported, which presents the internal raceway, must be hardened and ground, in turn, in a complicated fashion. Due to the lack of the needle roller cage, an increased basic load rating is indeed possible, but the intricate holding of the needle rollers with their tapering projections by the flange edges of the stop rims makes the assembly of such a bearing considerably more difficult.

Now, in this context, a needle bearing has indeed become known from DE 928 020, which appears, at first glance, to stand in direct relation with the solution according to the invention. In FIGS. 1 and 2, a needle bearing is shown, which is made from two bearing rings, which both have inwardly-facing and outwardly-facing rims. Apart from the fact that the needle bearing according to DE 928 020 is manufactured using a cutting method and not in a method without cutting, from the description it emerges that the rims are not equal. On page 2 in column 1, line 24ff. it is listed that, with reference to FIG. 1, at first the needles 1 are embedded in the inner ring 4 provided with the rims 2 and 3 with the help of a stiff grease and the previously heated outer ring 5 is pushed over from left to right via the needles. This method of production is allowed, in particular, in that only the rim 6 of the outer ring is constructed normally, while the rim 7 has a height that is so low that it allows the outer ring 5 expanded by heating to be pushed over the rim and creates a tight connection of the components 1, 4, and 5 after its cooling. This means that this shortened rim 7 has a height that is so low that a radial overlap between the bearing needle 1 and rim 7 is realized only in the μm range. Uncontrolled heating of the bearing could also lead to the result that no axial contact of the bearing needles 1 on the rim 7 of the outer ring is possible.

SUMMARY

Starting from the disadvantages of the known state of the art, the invention is therefore based on the objective of providing a ready-to-install needle bearing, which has a high load rating, which can be produced in an easy way without large expense, and which does not require complicated processing of a part to be supported.

According to the invention, this objective is met in that an associated internal raceway is formed by a thin-walled inner ring, which is shaped without cutting and which is provided on both sides with radially outward-facing stop rims, so that, between the stop rims, a circumferential annular gap is formed, wherein, in a middle position, the stop rims of the inner ring are aligned with the stop rims of the outer ring in the axial direction, and the needle rollers roll in a cageless manner or are disposed in a cage.

In this way, a ready-to-install needle bearing is made from bearing components including the outer ring, inner ring, and a needle roller set rolling in a cageless manner or a needle roller and cage assembly and is constructed as a captive unit by a positive fit connection. Due to the lack of a bearing cage, the load rating is significantly increased, because, on one hand, more needle rollers can be arranged in the peripheral direction and, on the other hand, the needle rollers have a similarly increased support surface. Due to the inner ring now provided, a part to be supported does not have to be used as a raceway of the needle rollers, so that it can remain soft, i.e., it does not need to be hardened and ground in a complicated fashion. Also, the needle bearing according to the invention can be completed and assembled by non-cutting technology in an effective way in different orders of magnitude.

In the case of the lack of a bearing cage, the load rating increases, because, on one hand, more needle rollers can be arranged in the peripheral direction and, on the other hand, the needle rollers have a similarly increased support surface in the axial direction. Through the cageless construction, a needle bearing for high loading is created, whose rotational speed is limited by the mutual contact of the needle rollers on their casing surfaces. However, such a needle bearing limited in rotational speed can be used advantageously for many cases, for example, for pivoting movements. In contrast, the cage variant might be somewhat limited in load rating, but allows a higher rotational speed with a simultaneously smoother running of the bearing.

According to another feature of the invention, the needle bearing is subjected to full hardening. Through the hardening of the bearing arrangement according to the invention, on one hand, its load rating is increased and, on the other hand, by full hardening it is achieved that all of the bearing components experience the same treatment, so that distortion can be minimized due to this equal treatment.

The associated method for the production of a needle bearing according to the invention is distinguished in that an outer ring is cut out from a drawn cup, shaped without cutting, and an inner ring is cut out from a drawn cup, shaped without cutting, then both rings are arranged concentric to each other, then needle rollers or a needle roller and cage assembly is inserted between the outer and inner rings, before both the stop rims of the outer and also the inner rings are turned back by a flanging or rolling process.

The invention will be explained in more detail using the embodiment below.

BRIEF DESCRIPTION OF THE DRAWINGS

Shown are.

DETAILED DESCRIPTION OF THE PREFERRED EMBODIMENTS

Figure 1:
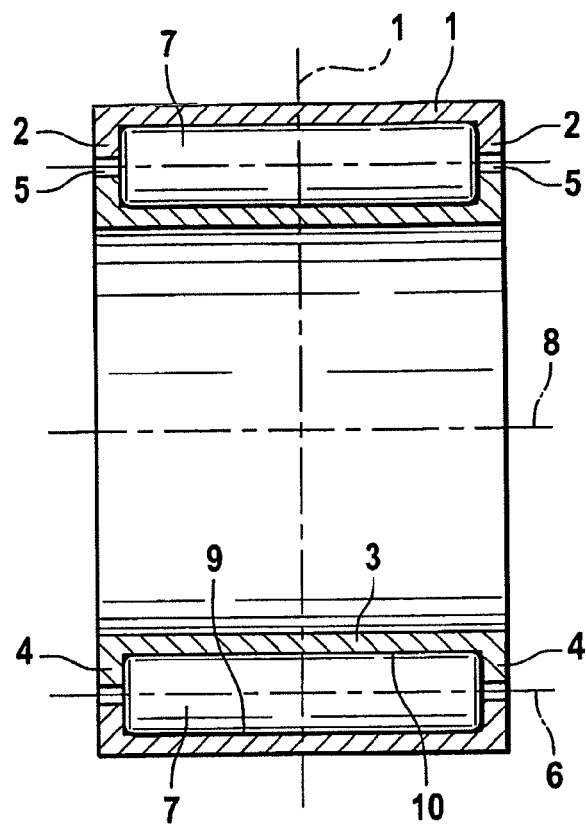
FIG. 1 is a longitudinal section view through a ready-to-install, cageless needle bearing constructed according to the invention.
Figure 2:
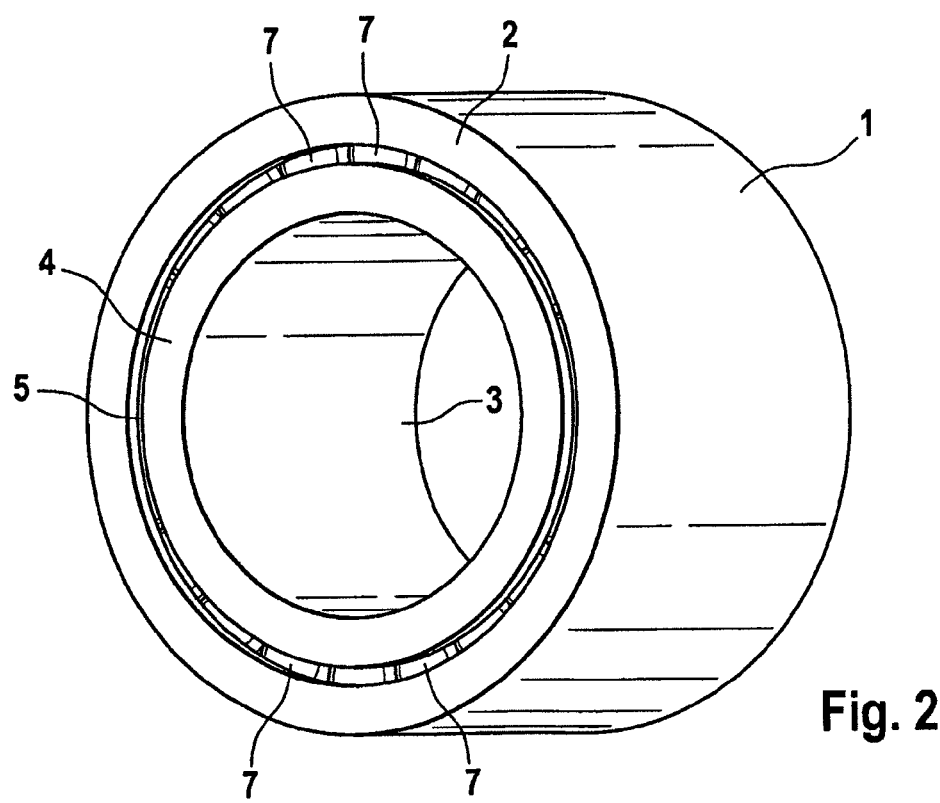
FIG. 2 is a perspective view of the needle bearing according to FIG. 1.

The ready-to-install needle bearing shown in FIGS. 1 and 2 and constructed according to the invention is made from the outer ring 1 and the inner ring 3, which are arranged concentric to each other. Both the outer ring 1 and also the inner ring 3 are provided on both sides on their axial ends with stop rims 2, 4, which face radially inwardly and radially outwardly, wherein a circumferential annular gap 5 is formed between the two. This can be varied in its radial extent by the length of the stop rims 2, 4, wherein for the smallest possible extent of the annular gap 5, an advantageous sealing of the bearing is realized. The radial extent of the stop rims 2, 4 here typically equals 25-40% of the diameter of the needle rollers 7, so that a reliable axial stop is realized. In the free space formed between the two rings 1, 3 and not shown in more detail, needle rollers 7 are housed, which rotate about their own axes 6 when the bearing rotates about the axis 8, wherein the external raceway is designated with 9 and the internal raceway is designated with 10. As can be further seen from FIGS. 1 and 2, the needle bearing is constructed as a ready-to-install, captive unit, which cannot come apart into its individual components. The cohesion is realized by positive back-gripping action between the stop rims 2, 4 and needle rollers 7. In FIG. 1, the needle bearing is shown in a middle position, wherein the stop rims 2, 4 align axially in both directions starting from the middle vertical 11. In other words, in the middle position, the stop rims 2, 4 overlap with an axial offset. It is understood that just due to the required tolerances between the stop rims 2, 4 and needle rollers 7, one bearing ring 1, 3 must be able to have a certain amount of axial displacement when the other bearing ring 3, 1 is fixed. In the present embodiment shown as an illustration, the needle rollers 7 roll in a cageless manner, i.e., without a bearing cage arranged between the bearing rings 1, 3, so that, through the largest possible number of these components, an optimum load rating is given. Here, the tangential needle rollers 7 do indeed contact at their contact points, at which their casing surfaces rub in the opposite rotational sense. Due to this greater loss power in the needle bearing, the rotational speed limit is indeed lowered, which, however, is not significant under certain conditions of use of such a needle bearing constructed according to the invention. This bearing could be used, for example, as a simple, cost-effective solution in the lower segment of power requirements.

The production of the ready-to-install needle bearing is performed, such that an outer ring 1 is initially cut from a thin-walled cylindrical drawn cup shaped without cutting and an inner ring 3 is cut from a cylindrical drawn cup that is smaller in diameter. The axial extent of the partitioned rings 1, 3 is here to be dimensioned so that the radial length of the stop rims 2, 4 desired at a later point is taken into consideration. Then the inner ring 3 is pushed into the outer ring 1 before needle rollers 7 are inserted in the annular space formed between the two. Through the known use of spinning tools, wherein a rotatable holding arbor and a similarly rotatable spinning roller are brought close to each other, the stop rims 2, 4 are formed by being turned back by 90° radially inwardly and radially outwardly from a starting position extending parallel to the bearing axis 8. Here, it can be advantageous when the raceways 9, 10 are gripped by the spinning tools for their smoothing.

A ready-to-install needle bearing described above according to the invention can be made, for example, from a full-hardened standard steel of the benchmark 100 Cr 6, i.e., a steel with 1% carbon and 1.5% chromium or from a steel of the benchmark C45M. After production, i.e., after its complete assembly into its final form, it is exposed to full hardening in a known manner. In this way, it is first heated to an austenizing temperature and then quenched for transformation into martensite. In this way, a hardness of 60 HRC is realized across the entire cross section for all bearing components.

In this way, a ready-to-install needle bearing unit is created, which is held together in a captive manner, has a high load capacity, and can be produced by a non-cutting shaping method in different dimensional ratios. The needle bearing can also receive small axial forces and ensures, through its inner ring, that a shaft to be supported does not have to be hardened and finely ground in a complicated fashion. In other words, the bearing is suitable, in particular, for so-called "low cost" applications, because only simple requirements are to be satisfied. This relates, in particular, to the lower rotational speed relative to cage-guided needle bearings for a simultaneous but increased load rating.

The description detailed above also applies for cage variants such as needle bearings with cages, which have been sufficiently well known for a long time to someone skilled in the art. Such needle bearings equipped with a cage follow, for example, from DE 1 623 501 U1, DE 66 05 971 U1, or DE 197 32 478 B4.

LIST OF REFERENCE NUMBERS

1 Outer ring
2 Stop rim
3 Inner ring
4 Stop rim
5 Annular gap
6 Axis
7 Needle roller
8 Axis
9 External raceway
10 Internal raceway
11 Middle vertical

The invention claimed is:

1. Ready-to-install needle bearing assembly comprising a continuous thin-walled outer ring, which is shaped without cutting and which is provided on both sides with integral radially inwardly-facing stop rims, with needle rollers rolling between the stop rims on an associated external raceway, an associated internal raceway is formed by a continuous thin-walled inner ring, which is shaped without cutting and which is provided on both sides with integral radially outwardly-facing stop rims, so that a circumferential annular gap is formed between the stop rims, wherein, in a middle position, the stop rims of the inner ring align with the stop rims of the outer ring in an axial direction, wherein the needle bearing assembly is subjected to full hardening which results in a uniform hardness across an entire cross-section of the needle bearing assembly.

2. Needle bearing assembly according to claim 1, wherein the needle rollers are supported to roll in a cageless manner.

3. Method for the production of a needle bearing assembly, comprising cutting a continuous thin-walled outer ring from a cylindrical drawn cup that is shaped without cutting and which is provided on both sides with integral radially inwardly-facing stop rims, and cutting a continuous thin-walled inner ring from a cylindrical drawn cup that is shaped without cutting and which is provided on both sides with integral radially outwardly-facing stop rims, arranging both of the rings concentric to each other, inserting needle rollers on an associated external raceway between the outer and inner rings, turning back both stop rims of the outer ring and both stop rims of the inner ring by a rolling process so that a circumferential annular gap is formed between the stop rims, wherein, in a middle position, the stop rims of the inner ring align with the stop rims of the outer ring in an axial direction, and subjecting the needle bearing assembly to full hardening which results in a uniform hardness across an entire cross-section of the needle bearing assembly.

\* \* \* \* \*